United States Patent
Kobayashi

(10) Patent No.: US 6,304,379 B1
(45) Date of Patent: Oct. 16, 2001

(54) REAR PROJECTION SCREEN

(75) Inventor: Hideki Kobayashi, Nakajho-machi (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/532,093

(22) Filed: Mar. 21, 2000

(30) Foreign Application Priority Data

Mar. 23, 1999 (JP) .................................................. 11-077097

(51) Int. Cl.$^7$ .................................................. G03B 21/60
(52) U.S. Cl. .................................................. 359/457
(58) Field of Search .................................. 359/455, 456, 359/457, 453, 460

(56) References Cited

U.S. PATENT DOCUMENTS

| | | | |
|---|---|---|---|
| 4,725,134 | * | 2/1988 | Ogino .................................. 359/457 |
| 4,919,515 | * | 4/1990 | Hasegawa et al. .................. 359/457 |
| 5,365,369 | * | 11/1994 | Ogino et al. ........................ 359/457 |
| 6,249,376 | * | 6/2001 | Goto .................................... 359/457 |

* cited by examiner

Primary Examiner—Christopher E. Mahoney
(74) Attorney, Agent, or Firm—Oblon, Spivak, McClelland, Maier & Neustadt, P.C.

(57) ABSTRACT

Moire fringes are effectively solved in rear projection screens including a combination of a Fresnel lens sheet and a lenticular lens sheet both having fine lens pitches. In a rear projection screen including a Fresnel lens sheet having a lens pitch of at most 0.12 mm and a lenticular lens sheet having a lens pitch of at most 0.6 mm, the pitch, $P_M$ (mm), of the moire fringes that may be given by the Fresnel lenses and the lenticular lenses at a spatial frequency of at least $3/P_1$ is at most 3 mm, the moire pitch, $P_M$ (mm), being given by formula (1), $P_M = 1/|n/P_1 - m/P_2|$ (wherein $P_1$ (mm) indicates the smaller one of the Fresnel lens pitch and the lenticular lens pitch, $P_2$ (mm) indicates the other one thereof, and n and m each are a natural number satisfying the formula (2), $n \leq 15 \times P_1/P_2$, and formula (3), $m \leq 15 \times P_2/P_1$).

2 Claims, 3 Drawing Sheets

1: Fresnel Lens Sheet

2: Lenticular Lens Sheet

1: Fresnel Lens Sheet

2: Lenticular Lens Sheet

REAR PROJECTION SCREEN

BACKGROUND OF THE INVENTION

1. Field of the Invention

The present invention relates to a rear projection screen provided with at least a Fresnel lens sheet and a lenticular lens sheet.

2. Description of the Related Art

The outline constitution of an ordinary rear projection screen is graphically shown in FIG. 1, in which 1 indicates a Fresnel lens sheet, and 2 indicates a lenticular lens sheet. In a rear projection screen, in general, a Fresnel lens sheet and a lenticular lens sheet are kept in contact with each other. Rays of image light having been projected on the rear of a rear projection screen provided with a Fresnel lens sheet and a lenticular lens sheet are collimated or converged by the Fresnel lens sheet, and the convergent rays shall have a focal point on the side of viewers spaced from the screen by from 5 to 20 meters. The collimated rays or convergent rays having passed through the Fresnel lens sheet are diffused by the lenticular lens sheet to a great extent in the horizontal direction, thereby enabling viewers to see the images in a broad field of view in the horizontal direction. To enlarge the viewing field of the images not only in the horizontal direction but also in the vertical direction, the lenticular lens sheet is generally made of a material that contains a diffusing agent.

FIG. 2 is a cross-sectional view graphically showing the outline constitution of a Fresnel lens sheet. In general, the Fresnel lens sheet is a sheet with concentric Fresnel lenses formed on its light-outgoing surface at a fine constant pitch, as illustrated. Optionally for intended capabilities, a fine lenticular lens sheet having a function of diffusing rays of image light in the vertical direction may be provided adjacent to the light-incoming surface of the Fresnel lens sheet. For preventing rays of image light from reflecting inside the Fresnel lens sheet to give ghost light, the Fresnel lens sheet may contain a diffusing agent. FIG. 3 is a cross-sectional view graphically showing the outline constitution of a lenticular lens sheet. As in FIG. 3, the lenticular lens sheet is a sheet with semicylindrical lenticular lenses formed on both the light-incoming surface and the light-outgoing surface each at a constant pitch. In general, black stripes are provided between the adjacent semicylindrical lenticular lenses on the light-outgoing surface of the sheet. These are for preventing external light from reflecting on the sheet to hit viewers. Apart from the illustrated one, known is a lenticular lens sheet of a different type having semicylindrical lenses formed only on the light-incoming surface.

Where a Fresnel lens sheet is combined with a lenticular lens sheet for use in image displays, the lenses formed on the two sheets each at a constant pitch shall have an area through which light could pass and an area through which light could not pass, thereby giving moire fringes. Precisely, as in FIG. 2, the region "a" of each Fresnel lens could pass light to the viewer's side but the region "b" thereof could not, whereby the light having passed through the Fresnel lens sheet gives concentric fringes at a fine constant pitch. On the other hand, a part of the lenticular lens could pass light, while the other thereof could not, with the result that the light having passed through the sheet gives vertical fringes at a fine constant pitch, as in FIG. 3.

In the combination of the two sheets, it is difficult to completely prevent such moire fringes, but it is possible to reduce them to a negligible level for practical use. Some techniques have been developed for reducing moire fringes to such a degree that they do not trouble viewers. For this, the lens pitches of the two sheets to be combined are optimized by specifically defining the ratio of the lens pitch of the Fresnel lens sheet to that of the lenticular lens sheet. For example, the ratio of the lens pitch of lenticular lenses to that of Fresnel lenses is defined to fall between N+0.35 and N+0.45 (N indicates a natural number) (see Japanese Patent Laid-Open No. 95525/1984); the ratio of the lens pitch of lenticular lenses to that of Fresnel lenses is defined to fall between N+0.25 and N+0.75 (N is an integer of at least 3) (see Japanese Patent Laid-Open No. 263932/1985); the ratio of the lens pitch of Fresnel lenses to that of lenticular lenses is defined to fall between 0.1505 and 0.1545 or between 0.1760 and 0.181 (see Japanese Patent Laid-Open No. 149540/1991). The pitch ratio of Fresnel lenses to lenticular lenses claimed in these references of prior patent applications is experimentally defined for reducing moire fringes to a negligible level.

With the increase in the resolution of rays of image light as in typically digital TVs, the lens pitches of the lenticular lens sheet and the Fresnel lens sheet for rear projection screens are being minimized these days. The lens pitch of ordinary lenticular lens sheets heretofore employed in the art generally falls between about 0.7 and 1.2 mm or so, but is being reduced to fall between about 0.1 and 0.52 mm or so with the increase in the resolution of rays of image light. In that situation, however, we, the present inventors have found that, in the combination of a lenticular lens sheet having a reduced lens pitch and a Fresnel lens sheet also having a reduced lens pitch, the ratio of the lens pitch of the Fresnel lens sheet to that of the lenticular lens sheet, which has heretofore been said the best as in the references mentioned above, could not satisfactorily solve the problem of moire fringes.

SUMMARY OF THE INVENTION

The present invention is to solve the problem noted above, and its object is to provide a rear projection screen comprising a Fresnel lens sheet having a fine lens pitch and a lenticular lens sheet also having a fine lens pitch, and capable of effectively solving the problem of moire fringes.

The rear projection screen which the invention provides to solve the problem noted above comprises a Fresnel lens sheet and a lenticular lens sheet, in which the lens pitch of the Fresnel lenses formed on the Fresnel lens sheet is at most 0.12 mm and the lens pitch of the lenticular lenses formed on the lenticular lens sheet is at most 0.6 mm, and which is characterized in that the pitch, $P_M$ (mm), of the moire fringes that may be given by the Fresnel lenses and the lenticular lenses at a spatial frequency of at least $3/P_1$ is at most 3 mm, the moire pitch, $P_M$ (mm), being given by the following formula (1):

$$P_M = 1/|n/P_1 - m/P_2| \tag{1}$$

wherein $P_1$ (mm) indicates the smaller one of the lens pitch of the Fresnel lenses and the lens pitch of the lenticular lenses;

$P_2$ (mm) indicates the other one of the two;

n and m each are a natural number satisfying the following formulae (2) and (3):

$$n \leq 15 \times P_1/P_2 \tag{2}$$

$$m \leq 15 \times P_2/P_1 \tag{3}$$

The invention is especially effective for rear projection screens having a ratio $P_L/P_F$ of at most 5 that often causes moire fringes, in which $P_F$ (mm) indicates the lens pitch of the Fresnel lenses, and $P_L$ (mm) indicates the lens pitches of the lenticular lenses.

DETAILED DESCRIPTION OF THE INVENTION

Figure 1:
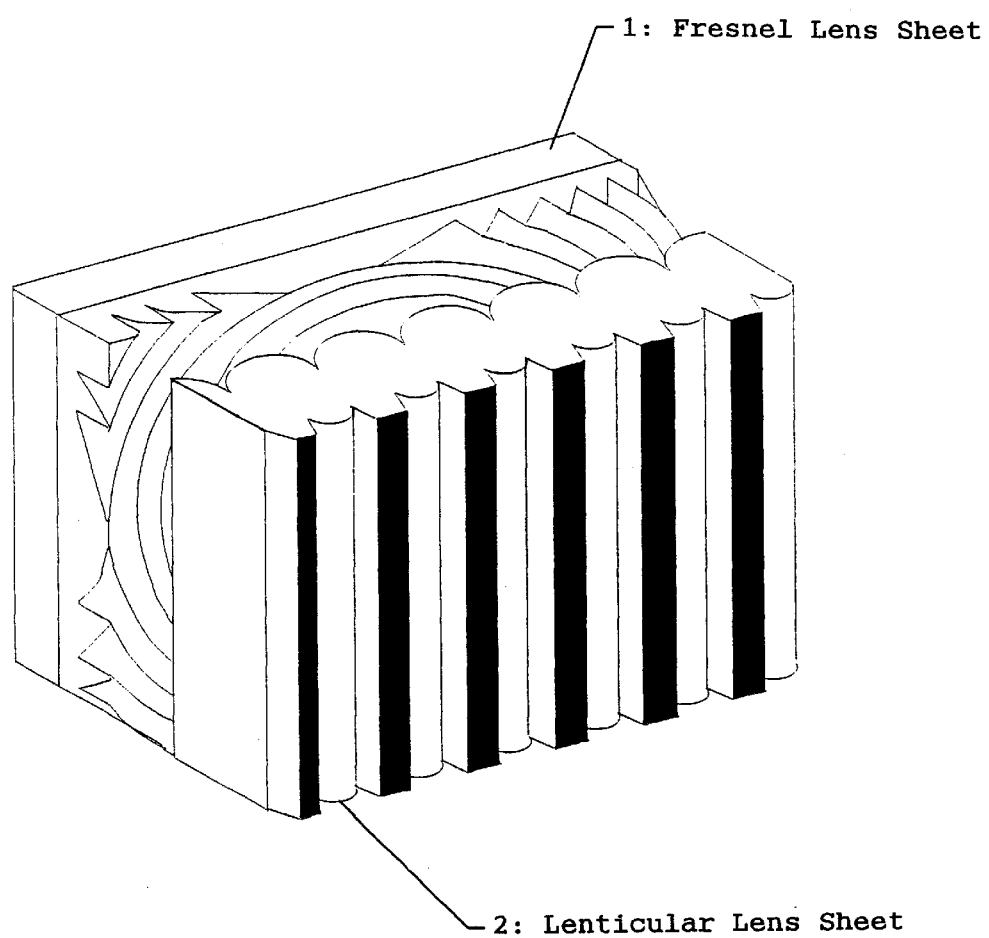
FIG. 1 is an outline view of a rear projection screen.

In the rear projection screen of the invention comprising a combination of a Fresnel lens sheet and a lenticular lens sheet, the pitch, $P_M$ (mm), of the moire fringes that may be formed in that combination shall be given by the formula (1) noted above. In the following description, referred to is one embodiment having a relationship of (Fresnel lens pitch)< (lenticular lens pitch), in which, therefore, the Fresnel lens pitch is given by $P_1$ (mm) and the lenticular lens pitch is by $P_2$ (mm). The same shall apply to the other embodiment having, as opposed to the above, a relationship of (Fresnel lens pitch)>(lenticular lens pitch).

In the basic case where n=1 in formula (1), the value given by formula (1) indicates the fundamental harmonic for the spatial frequency of the lens pitch of the Fresnel lenses, and the moire pitch $P_M$ given by it shall be the largest when $P_2=mP_1$. In other words, in this case, the screen shall have the most significant moire fringes when the lens pitch of the lenticular lenses is m times the lens pitch of the Fresnel lenses (where m indicates an integer). The next case where n=2 is referred to. The value given by formula (1) where n=2 indicates the double harmonic for the spatial frequency of the lens pitch of the Fresnel lenses, and the moire pitch $P_M$ given by it shall be the largest when $P_2=0.5 \times mP_1$. In other words, in this case, the screen shall have the most significant moire fringes when the lens pitch of the lenticular lenses is (m×½) times the lens pitch of the Fresnel lenses (where m indicates an integer). Similarly, where n=3, the value given by formula (1) indicates the triple higher harmonic; and where n=4, the value given by it indicates the quadruple higher harmonic. In those cases, the screen shall have the most significant fringes when the lens pitch of the lenticular lenses is (m×⅓) times or (m×¼) times the lens pitch of the Fresnel lenses (where m indicates an integer). Naturally, the same shall apply to the other cases where n is 5 or more. As is obvious from this, the screen shall have moire fringes from all triple and even higher harmonics, and it is extremely difficult to obtain the solution to the ratio of the lens pitches capable of solving all moire fringes in the range of higher harmonics.

In the prior art technique for reducing moire fringes, only the primary component or the secondary component of the fringes appearing in a screen is taken into consideration, and tried is optimizing the ratio of the lens pitches of lenticular lenses and Fresnel lenses constituting the screen. In that, the tertiary and higher harmonic components are not at all taken into consideration. This is because, in conventional rear projection screens comprising a combination of a lenticular lens sheet and a Fresnel lens sheet, the lens pitch ratio could be large, for example, 6 or more. In those, therefore, higher harmonics cause no problem of moire fringes. However, recent rear projection screens are often so designed that the lens pitch ratio is 5 or less as the lens pitches are being minimized more. As a result, in these screens, the tertiary and higher harmonic components could no more be ignored.

The present invention is directed to the solution of moire fringes that may appear in a rear projection screen comprising a combination of a Fresnel lens sheet and a lenticular lens sheet, in which the lens pitch of the Fresnel lenses is at most 0.12 mm and the lens pitch of the lenticular lenses is at most 0.6 mm. The lens pitch in ordinary Fresnel lens sheets is about 0.12 mm or so; and that in ordinary lenticular lens sheets falls between 0.7 and 1.2 mm or so. In the combination of such an ordinary Fresnel lens sheet and an ordinary lenticular lens sheet, the ratio of the lens pitch of the lenticular lenses to that of the Fresnel lenses falls between around 6 and 10 or so. In this, the harmonic ratio of higher harmonics of three times the spatial frequency of the lens pitch of the Fresnel lenses to the lenticular lens pitch shall be more than 15, and therefore, moire fringes that may be caused by such triple and higher harmonics could be negligible. As opposed to this, however, in rear projection screens comprising a combination of a Fresnel lens sheet and a lenticular lens sheet, in which the lens pitch of the Fresnel lenses is at most 0.12 mm and the lens pitch of the lenticular lenses is at most 0.6 mm, the ratio of the harmonic pitch of higher harmonics of three times the spatial frequency of the lens pitch of the Fresnel lenses to the lenticular lens pitch will be lower than 15. In these, therefore, moire fringes that may be caused by such higher harmonics must be taken into consideration.

If the moire fringes from higher harmonics could be thinned by the diffusing agent or the like contained in the Fresnel lens sheet or others that constitute rear projection screens, the screens will have no visible moire fringes. Now, the visibility of moire fringes appearing in rear projection screens comprising a combination of a Fresnel lens sheet and a lenticular lens sheet is discussed based on the ratio of the Fresnel lens pitch for higher harmonics to the lenticular lens pitch. We, the inventors have found that, in rear projection screens of that type for CRT systems, LCD systems, DMD systems and others, moire fringes are substantially negligible when the ratio of the Fresnel lens pitch for higher harmonics to the lenticular lens pitch falls between around 10 and 15 or so. Accordingly, in formula (1), $$P_M = 1/|n/P_1 - m/P_2| \qquad (1),$$

which indicates the pitch, $P_M$, of moire fringes that may appear in the combination of a Fresnel lens sheet and a lenticular lens sheet, only when n and m both satisfy formulae (2) and (3):

$$n \leq 15 \times P_1/P_2 \qquad (2)$$

$$m \leq 15 \times P_2/P_1 \qquad (3),$$

it will be necessary to solve the moire fringes from higher harmonics.

Moire fringes having a pitch of not larger than 3 mm, even if visible, could be negligible for image quality. Therefore, at a spatial frequency of at least $3/P_1$, the moire pitch, $P_M$, given by formula (1) is to be at most 3 mm.

DESCRIPTION OF THE PREFERRED EMBODIMENTS

Figure 2:
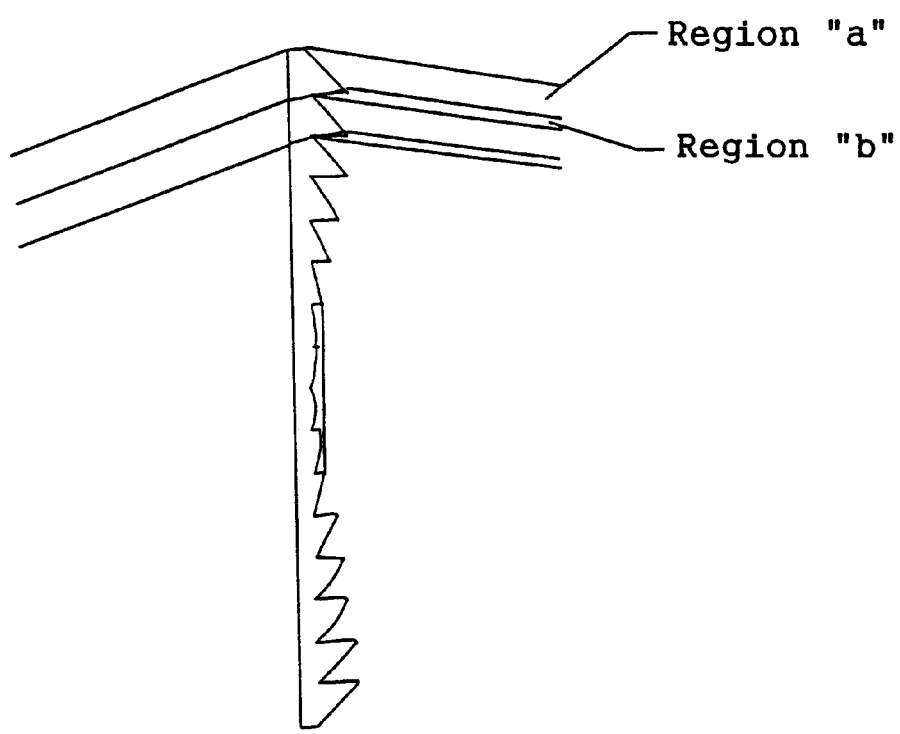
FIG. 2 is a graphical view of a Fresnel lens sheet for rear projection screens.
Figure 3:
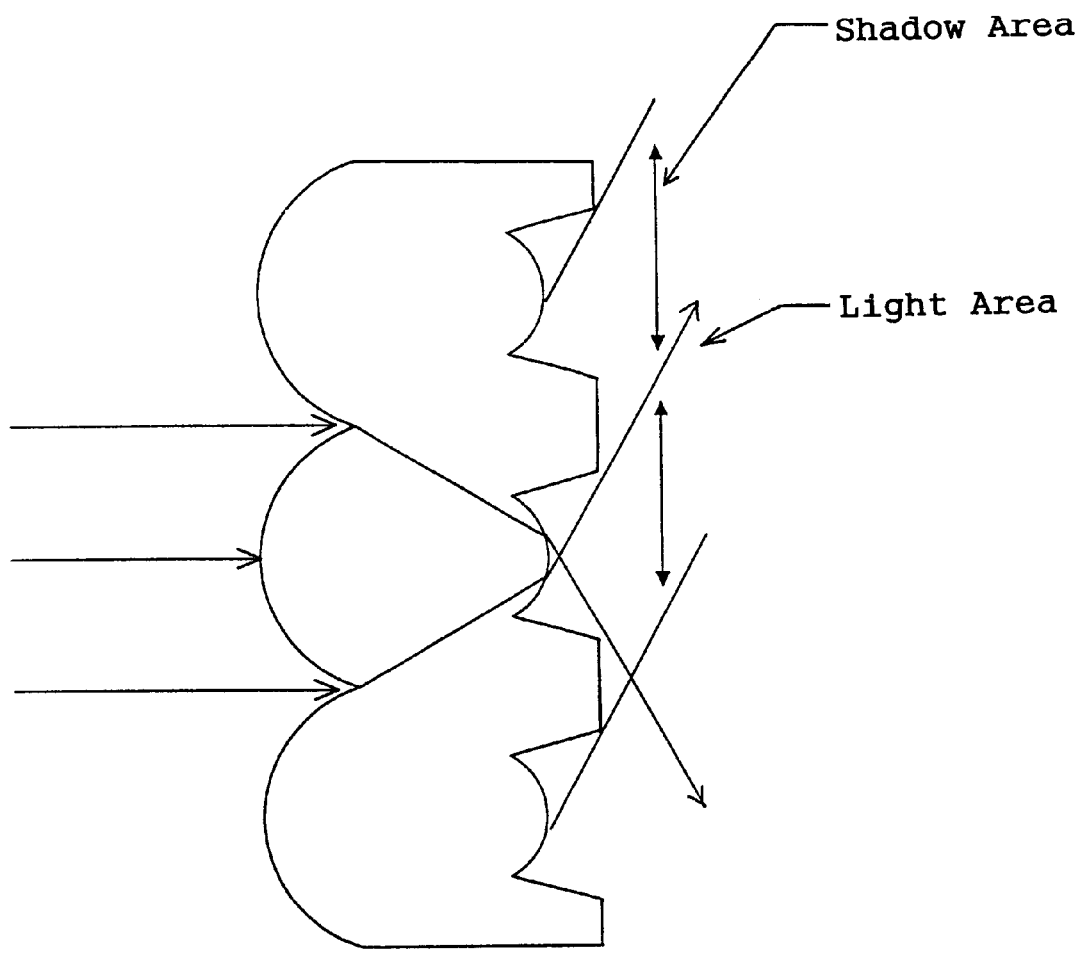
FIG. 3 is a graphical view of a lenticular lens sheet for rear projection screens.

The basic constitution of the rear projection screen of the invention may be the same as that of ordinary screens, for example, as in FIG. 1. For their basic constitution, the Fresnel lens sheet and the lenticular lens sheet that constitute the rear projection screen of the invention may also be the same as ordinary ones, for example, as in FIG. 2 and FIG.

3. If desired, a front panel and others may be combined with the Fresnel lens sheet and the lenticular lens sheet to construct the rear projection screen of the invention. The following Examples are to concretely demonstrate the invention, but not to restrict the scope of the invention.

EXAMPLES 1 to 3

A lenticular lens sheet having a lens pitch of 0.179 mm was combined with a Fresnel lens sheet having a lens pitch of 0.1124 mm to construct a rear projection screen. In the rear projection screen, the moire pitch (mm) and the ratio of the lenticular lens pitch to the Fresnel lens pitch relative to different harmonic components are shown in Table 1 (Example 1). A lenticular lens sheet having a lens pitch of 0.118 mm was combined with a Fresnel lens sheet having a lens pitch of 0.0835 mm to construct another rear projection screen. In the rear projection screen, the moire pitch (mm) and the ratio of the lenticular lens pitch to the Fresnel lens pitch relative to different harmonic components are shown in Table 2 (Example 2). A lenticular lens sheet having a lens pitch of 0.518 mm was combined with a Fresnel lens sheet having a lens pitch of 0.1124 mm to construct still another rear projection screen. In the rear projection screen, the moire pitch (mm) and the ratio of the lenticular lens pitch to the Fresnel lens pitch relative to different harmonic components are shown in Table 3 (Example 3). In the following Tables, the "wavelength-dependent ratio" is given by $(P_2 \times n)/P_1$ (in which $P_2$ indicates the lenticular lens pitch, and $P_1$ indicates the Fresnel lens pitch in all Examples and Comparative Examples given herein). Physically, it means the ratio of the lenticular lens pitch to the Fresnel lens pitch relative to varying harmonics (n/Fresnel lens pitch). The "moire pitch" therein is calculated as in formula (1). (In formula (1), m is a varying factor, and this is all the time so defined that the value, "moire pitch" given by that formula (1) is the largest.)

TABLE 1

| n | 1 | 2 | 3 | 4 |
|---|---|---|---|---|
| Moire Pitch (mm) | 0.43 | 0.97 | 0.80 | 0.48 |
| Wavelength-Dependent Ratio | 1.59 | 3.19 | 4.78 | 6.37 |

TABLE 2

| n | 1 | 2 | 3 | 4 | 5 |
|---|---|---|---|---|---|
| Moire Pitch (mm) | 0.29 | 0.68 | 0.49 | 0.34 | 1.79 |
| Wavelength-Dependent Ratio | 1.41 | 2.83 | 4.24 | 5.65 | 7.07 |

TABLE 3

| n | 1 | 2 | 3 | 4 |
|---|---|---|---|---|
| Moire Pitch (mm) | 1.32 | 2.39 | 2.97 | 1.19 |
| Wavelength-Dependent Ratio | 4.61 | 9.22 | 13.83 | 18.43 |

In these Examples, the substrate for the Fresnel lens sheets contains a diffusing agent to give a haze value of 18%, and has a thickness of 1.85 mm. On this, formed were Fresnel lenses in a 2P method. In these Examples, the lenticular lens sheet was prepared through extrusion molding. The lenticular lens sheet having a lens pitch of 0.179 mm (in Example 1) and that having a lens pitch of 0.118 mm (in Example 2) have lenticular lenses formed on the light-incoming surface only (these are of a "single-lenticulated type"). These lenticular lens sheets have a screen gain of 6.0. The lenticular lens sheet having a lens pitch of 0.518 mm (in Example 3) has lenticular lenses formed on both surfaces, and has black stripes formed on the light-outgoing surface. This has a screen gain of 6.0, like the others. The Fresnel lens sheet and the lenticular lens sheet in each Example were fitted into an optical projection system with LCD, and tested for moire fringes. No problematic moire fringes to detract from the image visibility were seen.

Comparative Examples 1 and 2

A lenticular lens sheet having a lens pitch of 0.179 mm was combined with a Fresnel lens sheet having a lens pitch of 0.1135 mm to construct a rear projection screen. In the rear projection screen, the moire pitch (mm) and the ratio of the lenticular lens pitch to the Fresnel lens pitch relative to different harmonic components are shown in Table 4 (Comparative Example 1). A lenticular lens sheet having a lens pitch of 0.118 mm was combined with a Fresnel lens sheet having a lens pitch of 0.0843 mm to construct another rear projection screen. In the rear projection screen, the moire pitch (mm) and the ratio of the lenticular lens pitch to the Fresnel lens pitch relative to different harmonic components are shown in Table 5 (Comparative Example 2).

TABLE 4

| n | 1 | 2 | 3 | 4 |
|---|---|---|---|---|
| Moire Pitch (mm) | 0.42 | 1.16 | 0.67 | 0.58 |
| Wavelength-Dependent Ratio | 1.58 | 3.15 | 4.73 | 6.30 |
| n | 5 | 6 | 7 | 8 |
| Moire Pitch (mm) | 1.56 | 0.39 | 4.51 | 0.47 |
| Wavelength-Dependent Ratio | 7.89 | 9.46 | 11.04 | 12.61 |

TABLE 5

| n | 1 | 2 | 3 | 4 | 5 |
|---|---|---|---|---|---|
| Moire Pitch (mm) | 0.30 | 0.59 | 0.59 | 0.29 | 99 |
| Wavelength-Dependent Ratio | 1.40 | 2.80 | 4.20 | 5.60 | 7.00 |

In these Comparative Examples, the substrate for the Fresnel lens sheets contains a diffusing agent to give a haze value of 18%, and has a thickness of 1.85 mm. On this, formed were Fresnel lenses in a 2P method. In these Comparative Examples, the lenticular lens sheets were prepared through extrusion molding to have lenticular lenses formed on the light-incoming surface only. These lenticular lens sheets have a screen gain of 6.0. The Fresnel lens sheet and the lenticular lens sheet in each Comparative Example were fitted into an optical projection system with LCD, and tested for moire fringes. Definite moire fringes detracting from the image visibility were seen.

Comparative Example 3

A lenticular lens sheet having a lens pitch of 0.189 mm was combined with a Fresnel lens sheet having a lens pitch of 0.1128 mm to construct a rear projection screen. In the rear projection screen, the moire pitch (mm) and the ratio of the lenticular lens pitch to the Fresnel lens pitch relative to different harmonic components are shown in Table 6 (Comparative Example 3).

TABLE 6

| n | 1 | 2 | 3 | 4 |
|---|---|---|---|---|
| Moire Pitch (mm) | 0.58 | 0.53 | 7.10 | 0.63 |
| Wavelength-Dependent Ratio | 1.68 | 3.35 | 5.02 | 6.70 |

In this Comparative Example, the substrate for the Fresnel lens sheet contains a diffusing agent to give a haze value of 30%, and has a thickness of 1.85 mm. On this, formed were Fresnel lenses in a 2P method. The lenticular lens sheet has lenticular lenses formed on the light-incoming surface only. This has a screen gain of 4.0. The Fresnel lens sheet and the lenticular lens sheet were fitted into an optical projection system with LCD, and tested for moire fringes. Definite moire fringes detracting from the image visibility were seen.

As described in detail hereinabove with reference to its embodiments, the invention has solved moire fringes even in rear projection screens comprising a combination of a Fresnel lens sheet and a lenticular lens sheet both having fine lens pitches.

While the invention has been described in detail and with reference to specific embodiments thereof, it will be apparent to one skilled in the art that various changes and modifications can be made therein without departing from the spirit and scope thereof.

What is claimed is:

1. A rear projection screen comprising a Fresnel lens sheet and a lenticular lens sheet, in which the lens pitch of the Fresnel lenses formed on the Fresnel lens sheet is at most 0.12 mm and the lens pitch of the lenticular lenses formed on the lenticular lens sheet is at most 0.6 mm, and which is characterized in that the pitch, $P_M$ (mm), of the moire fringes that may be given by the Fresnel lenses and the lenticular lenses at a spatial frequency of at least $3/P_1$ is at most 3 mm, the moire pitch, $P_M$ (mm), being given by the following formula (1):

$$P_M = 1/|n/P_1 - m/P_2| \quad (1)$$

wherein $P_1$ (mm) indicates the smaller one of the lens pitch of the Fresnel lenses and the lens pitch of the lenticular lenses;

$P_2$ (mm) indicates the other one of the two;

n and m each are a natural number satisfying the following formulae (2) and (3):

$$n \leq 15 \times P_1/P_2 \quad (2)$$

$$m \leq 15 \times P_2/P_1 \quad (3).$$

2. The rear projection screen as claimed in claim 1, wherein the ratio of the Fresnel lens pitch $P_F$ (mm) to the lenticular lens pitch $P_L$ (mm), $P_L/P_F$, is at most 5.

* * * * *